US010858561B2

(12) United States Patent
Abbas et al.

(10) Patent No.: US 10,858,561 B2
(45) Date of Patent: Dec. 8, 2020

(54) HEAT TRANSFER METHOD

(71) Applicant: Arkema France, Colombes (FR)

(72) Inventors: Laurent Abbas, Narbeth, PA (US); Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/027,743

(22) Filed: Jul. 5, 2018

(65) Prior Publication Data

US 2019/0048241 A1 Feb. 14, 2019

Related U.S. Application Data

(63) Continuation of application No. 13/122,890, filed as application No. PCT/FR2009/051943 on Oct. 13, 2009, now abandoned.

(30) Foreign Application Priority Data

Oct. 16, 2008 (FR) ...................................... 08 57032

(51) Int. Cl.
*C09K 5/04* (2006.01)

(52) U.S. Cl.
CPC .............. *C09K 5/044* (2013.01); *C09K 5/045* (2013.01); *C09K 2205/122* (2013.01); *C09K 2205/126* (2013.01)

(58) Field of Classification Search
CPC ........ C09K 2205/126; C09K 2205/122; C09K 2205/22; C09K 5/048
See application file for complete search history.

(56) References Cited

U.S. PATENT DOCUMENTS

| | | | |
|---|---|---|---|
| 5,065,990 A | 11/1991 | Durfee |
| 5,363,674 A | 11/1994 | Powell |
| 6,013,846 A | 1/2000 | Wismer et al. |
| 6,646,020 B2 | 11/2003 | Nyberg et al. |
| 6,814,884 B2 | 11/2004 | Jannick et al. |
| 7,438,826 B1 | 10/2008 | Chen et al. |
| 7,442,321 B1 | 10/2008 | Chen et al. |
| 7,674,756 B2 | 3/2010 | Johnson |
| 7,795,480 B2 | 9/2010 | Merkel et al. |
| 8,070,977 B2 | 12/2011 | Rached |
| 8,075,798 B2 | 12/2011 | Rached |
| 8,217,208 B2 | 7/2012 | Hulse et al. |
| 8,246,850 B2 | 8/2012 | Rached |
| 8,252,198 B2 | 8/2012 | Rached |
| 8,323,524 B2 | 12/2012 | Flynn et al. |
| 8,450,537 B2 | 5/2013 | Rao et al. |
| 8,454,853 B2 | 6/2013 | Van Horn |
| 8,541,478 B2 | 9/2013 | Singh et al. |
| 8,557,135 B2 | 10/2013 | Rached |
| 8,790,539 B2 | 7/2014 | Abbas |
| 8,808,569 B2 | 8/2014 | Rached |
| 8,858,824 B2 | 10/2014 | Boussand |
| 8,858,825 B2 | 10/2014 | Guerin et al. |
| 9,011,711 B2 | 4/2015 | Rached |
| 9,028,706 B2 | 5/2015 | Rached et al. |
| 9,039,922 B2 | 5/2015 | Rached |
| 9,127,191 B2 | 9/2015 | Rached |
| 9,133,379 B2 | 9/2015 | Rached |
| 9,157,018 B2 | 10/2015 | Rached et al. |
| 9,175,203 B2 | 11/2015 | Rached |
| 9,255,045 B2 | 2/2016 | Pigamo et al. |
| 9,267,064 B2 | 2/2016 | Rached |
| 9,267,065 B2 | 2/2016 | Van Horn |
| 9,279,074 B2 | 3/2016 | Rached |
| 9,315,708 B2 | 4/2016 | Guerin et al. |
| 9,399,726 B2 | 7/2016 | Rached |
| 9,505,968 B2 | 11/2016 | Rached |
| 9,512,343 B2 | 12/2016 | Rached et al. |
| 9,528,038 B2 | 12/2016 | Rached et al. |
| 9,599,381 B2 | 3/2017 | Rached |
| 9,650,551 B2 | 5/2017 | Collier et al. |
| 9,650,553 B2 | 5/2017 | Deur-Bert et al. |
| 9,663,697 B2 | 5/2017 | Rached |
| 9,676,984 B2 | 6/2017 | Guerin et al. |
| 9,683,155 B2 | 6/2017 | Deur-Bert et al. |
| 9,683,157 B2 | 6/2017 | Rached |
| 9,834,499 B2 | 12/2017 | Pigamo et al. |
| 9,884,984 B2 | 2/2018 | Rached |
| 9,908,828 B2 | 3/2018 | Rached et al. |
| 9,969,918 B2 | 5/2018 | Deur-Bert et al. |
| 9,982,178 B2 | 5/2018 | Rached et al. |
| 10,023,780 B2 | 7/2018 | Guerin et al. |

(Continued)

FOREIGN PATENT DOCUMENTS

| | | |
|---|---|---|
| CN | 101155892 A | 4/2008 |
| EP | 0 940 382 A1 | 9/1999 |

(Continued)

OTHER PUBLICATIONS

U.S. Appl. No. 16/102,320, Bonnet, et al.

(Continued)

*Primary Examiner* — John R Hardee
(74) *Attorney, Agent, or Firm* — Buchanan Ingersoll & Rooney P.C.

(57) ABSTRACT

A method of heat transfer by means of a composition containing hydrochlorofluoroolefins. A heat transfer method including, successively, a step of evaporation of a coolant fluid, a compression step, a step of condensation of said fluid at a temperature of greater than or equal to 70° C. and a step of expansion of said fluid, characterized in that that coolant fluid includes at least one hydrochlorofluoroolefin.

13 Claims, No Drawings

(56) References Cited

U.S. PATENT DOCUMENTS

| | | |
|---|---|---|
| 10,035,938 B2 | 7/2018 | Rached |
| 10,036,285 B2 | 7/2018 | Rached |
| 10,077,221 B2 | 9/2018 | Bonnet et al. |
| 10,119,055 B2 | 11/2018 | Boussand |
| 10,125,296 B2 | 11/2018 | Rached |
| 10,131,829 B2 | 11/2018 | Deur-Bert et al. |
| 10,252,913 B2 | 4/2019 | Bonnet et al. |
| 10,266,465 B2 | 4/2019 | Bonnet et al. |
| 10,316,231 B2 | 6/2019 | Rached |
| 10,343,963 B2 | 7/2019 | Bonnet |
| 10,358,592 B2 | 7/2019 | Rached |
| 10,377,935 B2 | 8/2019 | Guerin et al. |
| 10,399,918 B2 | 9/2019 | Rached |
| 10,407,603 B2 | 9/2019 | Rached et al. |
| 10,427,998 B2 | 10/2019 | Pigamo et al. |
| 10,450,488 B2 | 10/2019 | Boussand |
| 10,532,965 B2 | 1/2020 | Pigamo et al. |
| 10,604,690 B2 | 3/2020 | Collier et al. |
| 10,618,861 B2 | 4/2020 | Rached |
| 10,662,357 B2 | 5/2020 | Boussand |
| 10,669,465 B2 | 6/2020 | Rached |
| 2004/0180978 A1 | 9/2004 | Dreier |
| 2005/0156135 A1 | 7/2005 | Minor et al. |
| 2005/0285079 A1 | 12/2005 | Minor |
| 2006/0106263 A1 | 5/2006 | Miller et al. |
| 2006/0142173 A1 | 6/2006 | Johnson et al. |
| 2006/0266976 A1 | 11/2006 | Minor et al. |
| 2007/0100173 A1 | 5/2007 | Miller et al. |
| 2007/0100175 A1 | 5/2007 | Miller et al. |
| 2007/0145325 A1 | 6/2007 | Minor |
| 2008/0051612 A1 | 2/2008 | Knapp et al. |
| 2008/0098755 A1 | 5/2008 | Singh et al. |
| 2008/0125505 A1 | 5/2008 | Bowman et al. |
| 2009/0095014 A1 | 4/2009 | Sun et al. |
| 2009/0099274 A1 | 4/2009 | Van Der Puy et al. |
| 2009/0127496 A1 | 5/2009 | Rao et al. |
| 2009/0253820 A1 | 10/2009 | Bowman et al. |
| 2009/0305876 A1 | 12/2009 | Singh et al. |
| 2009/0318323 A1 | 12/2009 | Johnson et al. |
| 2010/0004155 A1 | 1/2010 | Ishihara et al. |
| 2010/0072415 A1 | 3/2010 | Rao |
| 2010/0102273 A1 | 4/2010 | Basu et al. |
| 2010/0105788 A1 | 4/2010 | Chen et al. |
| 2010/0113629 A1 | 5/2010 | Van Horn et al. |
| 2010/0154444 A1 | 6/2010 | Hulse et al. |
| 2010/0181524 A1 | 7/2010 | Elsheikh et al. |
| 2010/0187088 A1 | 7/2010 | Merkel et al. |
| 2010/0237279 A1 | 9/2010 | Hulse et al. |
| 2011/0037016 A1 | 2/2011 | Singh et al. |
| 2011/0041529 A1 | 2/2011 | Chen et al. |
| 2011/0084228 A1 | 4/2011 | Rached |
| 2011/0095224 A1 | 4/2011 | Rached |
| 2011/0112340 A1 | 5/2011 | Smith et al. |
| 2011/0186772 A1 | 8/2011 | Rached |
| 2011/0197602 A1 | 8/2011 | Abbas et al. |
| 2011/0218369 A1 | 9/2011 | Elsheikh et al. |
| 2011/0219791 A1 | 9/2011 | Rached |
| 2011/0219792 A1 | 9/2011 | Rached |
| 2011/0240254 A1 | 10/2011 | Rached |
| 2011/0284181 A1 | 11/2011 | Rached |
| 2011/0309287 A1 | 12/2011 | Chen et al. |
| 2011/0309288 A1 | 12/2011 | Chen et al. |
| 2011/0315915 A1 | 12/2011 | Abbas et al. |
| 2012/0012591 A1 | 1/2012 | Bowman et al. |
| 2012/0041239 A1 | 2/2012 | Suzuki et al. |
| 2012/0049104 A1 | 3/2012 | Rached |
| 2012/0053369 A1 | 3/2012 | Hulse et al. |
| 2012/0053372 A1 | 3/2012 | Hulse et al. |
| 2012/0056122 A1 | 3/2012 | Hulse et al. |
| 2012/0056123 A1 | 3/2012 | Rached |
| 2012/0068105 A1 | 3/2012 | Rached et al. |
| 2012/0117990 A1 | 5/2012 | Rached |
| 2012/0128964 A1 | 5/2012 | Hulse |
| 2012/0138847 A1 | 6/2012 | Van Horn et al. |
| 2012/0144857 A1 | 6/2012 | Rached |
| 2012/0145955 A1 | 6/2012 | Abbas et al. |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161063 A1 | 6/2012 | Singh |
| 2012/0161064 A1 | 6/2012 | Rached |
| 2012/0167615 A1 | 7/2012 | Rached |
| 2012/0205574 A1 | 8/2012 | Rached et al. |
| 2012/0226081 A1 | 9/2012 | Elsheikh et al. |
| 2012/0329893 A1 | 12/2012 | Abbas |
| 2013/0004435 A1 | 1/2013 | Cook et al. |
| 2013/0037058 A1 | 2/2013 | Abbas |
| 2013/0092869 A1 | 4/2013 | Boussand |
| 2013/0105724 A1 | 5/2013 | Boussand |
| 2013/0119300 A1 | 5/2013 | Van Horn et al. |
| 2013/0186114 A1 | 7/2013 | Guerin et al. |
| 2013/0231399 A9 | 9/2013 | Basu et al. |
| 2014/0008565 A1 | 1/2014 | Rached et al. |
| 2014/0012052 A1 | 1/2014 | Pham et al. |
| 2014/0070129 A1 | 3/2014 | Kennoy et al. |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0034523 A1 | 2/2015 | Kopkalli et al. |
| 2015/0152235 A1 | 6/2015 | Abbas |
| 2015/0152306 A1 | 6/2015 | Rached |
| 2015/0152307 A1 | 6/2015 | Rached |
| 2015/0197467 A1 | 7/2015 | Pigamo et al. |
| 2015/0231527 A1 | 8/2015 | Singh |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0009973 A1 | 1/2016 | Rached et al. |
| 2016/0023034 A1 | 1/2016 | Elsheikh et al. |
| 2016/0023176 A1 | 1/2016 | Bonnet et al. |
| 2016/0023974 A1 | 1/2016 | Bonnet et al. |
| 2016/0024363 A1 | 1/2016 | Rached |
| 2016/0025394 A1 | 1/2016 | Rached |
| 2016/0031773 A1 | 2/2016 | Bonnet et al. |
| 2016/0046548 A1 | 2/2016 | Bonnet et al. |
| 2016/0115104 A1 | 4/2016 | Pigamo et al. |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0257867 A1 | 9/2016 | Chen et al. |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218241 A1 | 8/2017 | Deur-Bert et al. |
| 2017/0218242 A1 | 8/2017 | Rached |
| 2018/0086173 A1 | 3/2018 | Rached |
| 2018/0093934 A1 | 4/2018 | Pigamo et al. |
| 2018/0126348 A1 | 5/2018 | Bonnet et al. |
| 2018/0134936 A1 | 5/2018 | Rached |
| 2018/0148394 A1 | 5/2018 | Pigamo et al. |
| 2018/0148395 A1 | 5/2018 | Rached et al. |
| 2018/0244970 A1 | 8/2018 | Rached |
| 2018/0282603 A1 | 10/2018 | Guerin et al. |
| 2018/0320560 A1 | 11/2018 | Rached |
| 2018/0327645 A1 | 11/2018 | Boussand |
| 2018/0354875 A1 | 12/2018 | Bonnet |
| 2019/0016937 A1 | 1/2019 | Andre et al. |
| 2019/0023957 A1 | 1/2019 | Rached |
| 2019/0040292 A1 | 2/2019 | Rached |
| 2019/0048518 A1 | 2/2019 | Wong et al. |
| 2019/0203094 A1 | 7/2019 | Rached |
| 2019/0249057 A1 | 8/2019 | Rached |

(56) References Cited

U.S. PATENT DOCUMENTS

| | | |
|---|---|---|
| 2019/0276721 A1 | 9/2019 | Rached |
| 2019/0284500 A1 | 9/2019 | Rached |
| 2019/0337874 A1 | 11/2019 | Rached et al. |
| 2019/0359870 A1 | 11/2019 | Rached |
| 2019/0367789 A1 | 12/2019 | Rached |
| 2019/0375698 A1 | 12/2019 | Pigamo et al. |
| 2020/0048518 A1 | 2/2020 | Rached |
| 2020/0087555 A1 | 3/2020 | Rached |
| 2020/0216734 A1 | 7/2020 | Rached et al. |

FOREIGN PATENT DOCUMENTS

| | | |
|---|---|---|
| JP | S62-225860 A | 10/1987 |
| JP | H02-120338 A | 5/1990 |
| JP | H03-168566 A | 7/1991 |
| JP | H04-110388 A | 4/1992 |
| JP | H06-272978 A | 9/1994 |
| JP | 2002-501035 A | 1/2002 |
| JP | 2008-133438 A | 6/2008 |
| JP | 2008-524433 A | 7/2008 |
| JP | 2011-037912 A | 2/2011 |
| JP | 2011-510119 A | 3/2011 |
| JP | 2012-506944 A | 3/2012 |
| WO | WO 99/37598 A1 | 7/1999 |
| WO | WO 02/40613 A1 | 5/2002 |
| WO | WO 2004/037913 A2 | 5/2004 |
| WO | WO 2004/037913 A3 | 5/2004 |
| WO | WO 2006/069362 A2 | 6/2006 |
| WO | WO 2006/069362 A3 | 6/2006 |
| WO | WO 2007/002625 A2 | 1/2007 |
| WO | WO 2007/002625 A3 | 1/2007 |
| WO | WO 2007/053736 A2 | 5/2007 |
| WO | WO 2008/002500 A1 | 1/2008 |
| WO | WO 2009/003165 A1 | 12/2008 |
| WO | WO 2009/089511 A2 | 7/2009 |
| WO | WO 2009/089511 A3 | 7/2009 |
| WO | WO 2009/140231 A2 | 11/2009 |
| WO | WO 2010/043807 A1 | 4/2010 |
| WO | WO 2010/059493 A1 | 5/2010 |
| WO | WO 2010/062572 A2 | 6/2010 |
| WO | WO 2010/062572 A3 | 6/2010 |
| WO | WO 2010/085397 A1 | 7/2010 |
| WO | WO 2010/088196 A2 | 8/2010 |
| WO | WO 2010/088196 A3 | 8/2010 |
| WO | WO 2014/158663 A1 | 10/2014 |

OTHER PUBLICATIONS

International Search Report issued in PCT/FR2009/051943, dated Feb. 8, 2010, 5 pages, European Patent Office, Rijswijk, NL (English and French versions).

Official Action issued in JP 2011-531537, dated Jan. 20, 2016, 7 pages, Japan Patent Office, JP.

Official Action issued in JP 2015-026010, dated Mar. 1, 2016, 6 pages (3 pages JP OA; 3 pages Machine English-language translation), Japanese Patent Office, JP.

Bonnet, Philippe, et al., U.S. Appl. No. 16/102,320 entitled "Composition Comprising HF and E-3,3,3-Trifluoro-1-Chloropropene," filed Aug. 13, 2018.

U.S. Appl. No. 16/333,003, Rached.

Official Action issued in CN 201610607752.3, dated Sep. 26, 2018, 6 pages (English-language translation only), State Intellectual Property Office of the People's Republic of China, CN.

Zheng, Zuyi, *Application of Heat Pump Technology in Air Conditioning*, China Mechanical Press, 1st edition, Jul. 1998, five pages including page 9, title page, publisher information, and English-language translation of page 9.

Xiuling Yuan, Editor, *Refrigeration and Air-Conditioning Apparatus*, Xi'an Jiaotong University Press, $1^{st}$ edition, Mar. 2001, four pages including page 37, title page, publisher information, and English-language translation of page 37.

Rached, Wissam, U.S. Appl. No. 16/333,003 entitled "Composition Comprising 1-Chloro-3,3,3-Trifluoropropene," filed Mar. 13, 2019.

Notice of Opposition mailed in EP 2 334 750, Jan. 17, 2019, 15 pages, European Patent Office, Munich, DE.

Yamamoto, Hiroyasu, et al., "Compression Type Heat Pump", Application and Economy of Heat Pump, Technical Report, No. 52, Chapter 4, Feb. 27, 1984, pp. 117-134 (22 pages including Partial English-language translation).

U.S. Appl. No. 16/545,294, Pigamo, et al.

Pigamo, Anne, et al., U.S. Appl. No. 16/545,294 entitled "Compositions Based on 1,1,3,3-Tetrachloropropene," filed Aug. 20, 2019.

U.S. Appl. No. 16/641,024, Rached, et al.

Rached, Wissam, et al., U.S. Appl. No. 16/641,024, entitled "Composition on the Basis of Hydrochlorofluoroolefin and Mineral Oil," filed Feb. 21, 2020.

"Earth's Atmosphere," *Concise Science Dictionary*, 1984, three pages including p. 218, Oxford University Press, Oxford, England.

U.S. Appl. No. 14/615,900, Wissam Rached, filed Feb. 6, 2015, (Cited herein as US Patent Application Publication No. 2015/0152235 A1 of Jun. 4, 2015).

U.S. Appl. No. 16/102,320, Philippe Bonnet, Bertrand Collier, Dominique Deur-Bert and Laurent Wendlinger, filed Aug. 13, 2018.

U.S. Appl. No. 15/809,477, Anne Pigamo, John Wismer, Bertrand Collier and Philippe Bonnet, filed Nov. 10, 2017, (Cited herein as US Patent Application Publication No. 2018/0093934 A1 of Apr. 5, 2018).

U.S. Appl. No. 15/575,980, Anne Pigamo and Bertrand Collier, filed Nov. 21, 2017, (Cited herein as US Patent Application Publication No. 2018/0148394 A1 of May 31, 2018).

U.S. Appl. No. 16/641,024, Wissam Rached and Pascale Kindler, filed Feb. 21, 2020.

U.S. Appl. No. 16/514,241, Wissam Rached, Sophie Guérin, Pascale Kindler, filed Jul. 17, 2019, (Cited herein as US Patent Application Publication No. 2019/0337874 A1 of Nov. 7, 2019).

HEAT TRANSFER METHOD

CROSS REFERENCE TO RELATED APPLICATIONS

The present application is a continuation of U.S. application Ser. No. 13/122,890, filed on Apr. 6, 2011, which is a U.S. National stage of International Application No. PCT/FR2009/051943, filed on Oct. 13, 2009, which claims the benefit of French Application No. 0857032, filed on Oct. 16, 2008. The entire contents of each of U.S. application Ser. No. 13/122,890, International Application No. PCT/FR2009/051943, and French Application No. 0857032 are hereby incorporated herein by reference in their entirety.

TECHNICAL FIELD

The present invention relates to a heat transfer process using a composition containing hydrochlorofluoroolefins. It relates more particularly to the use of a composition containing hydrochlorofluoroolefins in heat pumps.

BACKGROUND

The problems posed by substances which deplete the atmospheric ozone layer (ODP: ozone depletion potential) were tackled at Montreal, where the protocol imposing a reduction in the production and use of chlorofluorocarbons (CFCs) was signed. This protocol has been the subject of amendments which have required that CFCs be withdrawn and have extended regulatory control to other products.

The refrigeration industry and the air conditioning industry have invested a great deal in the replacement of these refrigerant fluids.

In the automotive industry, the air conditioning systems for vehicles sold in many countries have changed from a chlorofluorocarbon (CFC-12) refrigerant fluid to a hydrofluorocarbon (1,1,1,2-tetrafluoroethane: HFC-134a) refrigerant fluid which is less harmful to the ozone layer. However, from the viewpoint of the objectives set by the Kyoto protocol, HFC-134a (GWP=1300) is regarded as having a high warming potential. The contribution to the greenhouse effect of a fluid is quantified by a criterion, the GWP (Global Warming Potential), which indexes the warming potential by taking a reference value of 1 for carbon dioxide.

As carbon dioxide is non-toxic and non-flammable and has a very low GWP, it has been proposed as a refrigerant fluid for air conditioning systems as a replacement for HFC-134a. However, there are several disadvantages to the use of carbon dioxide, related in particular to the very high pressure of the use thereof as a refrigerant fluid in existing devices and technologies.

Document JP 4110388 describes the use of hydro-fluoropropenes of formula $C_3H_mF_n$ with m and n representing an integer between 1 and 5 inclusive and m+n=6, as heat transfer fluids, in particular tetrafluoropropene and trifluoropropene.

Document WO 2004/037913 discloses the use of compositions comprising at least one fluoroalkene having three or four carbon atoms, in particular pentafluoropropene and tetrafluoropropene, preferably having a GWP at most of 150, as heat transfer fluids.

In document WO 2007/002625, fluorohaloalkenes having from to 6 carbon atoms, in particular tetrafluoropropenes, pentafluoropropenes and chlorotrifluoropropenes, have been described as capable of being used as a heat transfer fluid.

In the field of heat pumps, substitutes for dichlorotetrafluoroethane (HCFC-114), used under conditions of high condensing temperature, have been proposed. Thus, document U.S. Pat. No. 6,814,884 describes a composition comprising 1,1,1,3,3-pentafluorobutane (HFC-365mfc) and at least one compound chosen from 1,1,1,2-tetrafluoroethane, pentafluoroethane (HFC-125), 1,1,1,3,3-pentafluoropropane (HFC-245fa) and 1,1,1,2,3,3,3-heptafluoropropane (HFC-227ea). However, these compounds have a high GWP.

DETAILED DESCRIPTION

The applicant has now discovered that compositions containing hydrochlorofluoroolefins are very particularly suitable as heat transfer fluid in heat pumps, in particular heat pumps that operate at a high condensing temperature. Moreover, these compositions have a negligible ODP and a GWP below that of existing heat transfer fluids.

The term "hydrochlorofluoroolefins" is understood to mean olefins having from 3 to 4 carbon atoms that comprise one chlorine atom and at least one fluorine atom. Preferably, the chlorine atom is borne by the unsaturated carbon.

A heat pump is a thermodynamic device allowing the transfer of heat from the coldest medium to the hottest medium. The heat pumps used for heating are referred to as compression heat pumps and the operation is based on the principle of the compression cycle of fluids, referred to as refrigerant fluids. These heat pumps operate with compression systems comprising a single or several stage(s). At a given stage, when the refrigerant fluid is compressed and passes from the gaseous state to the liquid state, an exothermic reaction (condensation) takes place that produces heat. Conversely, if the fluid is expanded by passing it from the liquid state to the gaseous state, an endothermic reaction (evaporation) takes place, which produces a cold sensation. Everything therefore relies on the change of state of a fluid used in a closed circuit.

Each stage of a compression system comprises (i) a step of evaporation during which, in contact with heat drawn from the surroundings, the refrigerant fluid, by virtue of its low boiling point, changes from the liquid state to the gaseous state, (ii) a step of compression during which the gas from the preceding step is brought to high pressure, (iii) a step of condensation during which the gas will transmit its heat to the heating circuit; the refrigerant, still compressed, becomes liquid again and (iv) a step of expansion during which the pressure of the fluid is reduced. The fluid is ready for a new absorption of heat from the cold environment.

One subject of the present invention is a heat transfer process using a compression system having at least one stage successively comprising a step of evaporation of a refrigerant fluid, a step of compression, a step of condensation of said fluid at a temperature greater than or equal to 70° C. and a step of expansion of said fluid characterized in that the refrigerant fluid comprises at least one hydrochlorofluoroolefin.

Preferably, the condensing temperature of the refrigerant fluid is between 70 and 140° C., and advantageously between 95 and 125° C.

Preferably, the hydrochlorofluoroolefins comprise at least three fluorine atoms.

Particularly advantageous hydrochlorofluoroolefins are chlorotrifluoropropenes (HCFO-1233), in particular 1-chloro-3,3,3-trifluoropropene (HCFO-1233zd) and 2-chloro-3,3,3-trifluoropropene (HCFO-1233xf). The 1-chloro-3,3,3-trifluoropropene may be in either cis form or trans form.

Besides the hydrochlorofluoroolefin(s), the refrigerant fluid may comprise at least one hydrofluorocarbon.

As hydrofluorocarbons, mention may especially be made of 1,1,1,3,3-pentafluorobutane, 1,1,1,2-tetrafluoroethane, pentafluoroethane, 1,1,1,3,3-pentafluoropropane, 1,1,1,2,3-pentafluoropropane, 1,1,1,2,2-penta-fluoropropane and 1,1,1,2,3,3,3-heptafluoropropane.

The refrigerant fluid may also comprise at least one fluoroether, preferably at least one hydrofluoroether and advantageously at least one hydrofluoroether having from three to six carbon atoms.

As hydrofluoroethers, mention may especially be made of heptafluoromethoxypropane, nonafluoromethoxybutane and nonafluoroethoxybutane.

The hydrofluoroether is available in several isomeric forms such as 1,1,1,2,2,3,3,4,4-nonafluoroethoxybutane, 1,1,1,2,3,3-hexafluoro-2-(trifluoromethyl)-3-ethoxybutane, 1,1,1,2,2,3,3,4,4-nonafluoromethoxybutane and 1,1,1,2,3,3-hexafluoro-2-(trifluoromethyl)-3-methoxybutane.

The refrigerant fluid may also comprise at least one fluoroalkene having from 3 to 6 carbon atoms. Preferably, the fluoroalkene is chosen from fluoropropenes, in particular trifluoropropenes such as 1,1,1-trifluoropropene, tetrafluoropropenes such as 2,3,3,3-tetrafluoropropene (HFO-1234yf), 1,3,3,3-tetrafluoropropene and fluorobutenes. Fluoromethylpropenes may be suitable.

Preferably, the refrigerant fluid comprises at least 10% by weight of hydrochlorofluoroolefins.

The refrigerant fluid used in the present invention may comprise a stabilizer of the hydrochlorofluoroolefin. The stabilizer represents at most 5% by weight relative to the total composition of the fluid.

As stabilizers, mention may especially be made of nitromethane, ascorbic acid, terephthalic acid, azoles such as tolutriazole or benzotriazole, phenolic compounds such as tocopherol, hydroquinone, t-butylhydroguinone, 2,6-di-cert-butyl-4-methylphenol, epoxides (alkyl, optionally fluorinated or perfluorinated, or alkenyl or aromatic epoxides) such as n-butyl glycidyl ether, hexanediol diglycidyl ether, allyl glycidyl ether or butylphenyl glycidyl ether, phosphites, phosphates, phosphonates, thiols and lactones.

The refrigerant used in the process according to the present invention may comprise lubricants such as mineral oil, alkylbenzene, polyalkylene glycol and polyvinyl ether.

EXPERIMENTAL SECTION

In what follows:
Evap P is the pressure at the evaporator
Cond P is the pressure at the condenser
T cond is the condensing temperature
Te comp is the compressor inlet temperature
Ratio: the compression ratio
T outlet comp is the compressor outlet temperature
COP: coefficient of performance and is defined, where a heat pump is concerned, as being the useful heat power provided the system over the power taken in or consumed by the system
CAP: volumetric capacity, heat capacity per unit volume (kJ/m.sup.3)
% CAP or COP is the ratio of the value of the CAP or COP of the fluid relative to that obtained with HCFC-114.

Example 1

The performances of the refrigerant fluid under the heat pump operating conditions and by setting the temperature at the evaporator to 10° C. and that at the condenser to 100° C. are given below.

For HCFC-114, the nominal operating pressure is 14.19 bar, the volumetric capacity is 785 kJ/m.sup.3 and the COP is 2.07 under the following operating conditions:
Isentropic efficiency of the compressor: 80%

|  | HCFC-114 | HFC-365mfc | HCFO-1233zd | HFC-365mfc/HFC-227ea |
|---|---|---|---|---|
| Temp evap (° C.) | 10 | 10 | 10 | 10 |
| T e comp | 15 | 15 | 15 | 15 |
| Evap P (kPa) | 129 | 30 | 76 |  |
| Cond P (kPa) | 1419 | 590 | 1048 |  |
| Ratio (p/p) | 11.04 | 19.81 | 13.72 | 27.1 |
| T cond (° C.) | 100 | 100 | 100 | 100 |
| T outlet comp (° C.) | 100 | 100 | 103 |  |
| CAP (kJ/m$^3$) | 785 | 260 | 630 | 374 |
| COP | 2.07 | 2.30 | 2.42 | 2.40 |
| % CAP | 100 | 33 | 80 | 48 |
| % COP | 100 | 111 | 117 | 116 |

Example 2

The performances of the refrigerant fluid under the heat pump operating conditions and by setting the temperature at the evaporator to 50° C. and that at the condenser to 80° C. are given below.

For HCFC-114, the nominal operating pressure is 9.3 bar, the volumetric capacity is 3321 kJ/m.sup.3 and the COP is 8.19 under the following operating conditions:
Isentropic efficiency of the compressor: 80%

|  | HCFC-114 | HFC-365mfc | HCFO-1233zd |
|---|---|---|---|
| Temp outlet evap (° C.) | 50 | 50 | 50 |
| T e comp (° C.) | 65 | 65 | 65 |
| Evap P (kPa) | 447 | 142 | 298 |
| Cond P (kPa) | 930 | 352 | 663 |
| Ratio (p/p) | 2.08 | 2.48 | 2.22 |
| T cond (° C.) | 80 | 80 | 80 |
| T outlet comp (° C.) | 90 | 87 | 94 |
| CAP (kJ/m$^3$) | 3321 | 1394 | 2554 |
| COP | 8.19 | 8.60 | 8.53 |
| % CAP | 100 | 42 | 77 |
| % COP | 100 | 105 | 104 |

Example 3

The performances of the refrigerant fluid under the heat pump operating conditions and by setting the temperature at the evaporator to 50° C. and the temperature at the condenser to 95° C. are given below.

For HCFC-114, the nominal operating pressure is 12.82 bar, the volumetric capacity is 2976 kJ/m.sup.3 and the COP is 5.19 under the following operating conditions:
Isentropic efficiency of the compressor: 80%

|  | HCFC-114 | HFC-365mfc | HCFO-1233zd | HFO-1234yf |
|---|---|---|---|---|
| Temp evap (° C.) | 50 | 50 | 50 | 50 |
| T e comp (° C.) | 65 | 65 | 65 | 65 |
| Evap P (kPa) | 447 | 142 | 298 | 1283 |
| Cond P (kPa) | 1282 | 522 | 939 | 3345 |
| Ratio (p/p) | 2.87 | 3.67 | 3.15 | 2.61 |
| T cond (° C.) | 95 | 95 | 95 | 95 |
| T outlet comp (° C.) | 103 | 98 | 107 | 113 |
| CAP (kJ/m$^3$) | 2976 | 1284 | 2379 | 4065 |

|  | HCFC-114 | HFC-365mfc | HCFO-1233zd | HFO-1234yf |
|---|---|---|---|---|
| COP | 5.19 | 5.56 | 5.56 | 2.80 |
| % CAP | 100 | 43 | 80 | 137 |
| % COP | 100 | 107 | 107 | 54 |

Example 4

The performances of the refrigerant fluid under the heat pump operating conditions and by setting the temperature at the evaporator to 50° C. and that at the condenser to 110° C. are given below.

For HCFC-114, the nominal operating pressure is 17.26 bar, the volumetric capacity is 2573 kJ/m.sup.3 and the COP is 3.56 under the following operating conditions:
Isentropic efficiency of the compressor: 80%

|  | HCFC-114 | HFC-365mfc | HCFO-1233zd |
|---|---|---|---|
| Temp evap (° C.) | 50 | 50 | 50 |
| T e comp (° C.) | 65 | 65 | 65 |
| Evap P (kPa) | 447 | 142 | 298 |
| Cond P (kPa) | 1726 | 748 | 1294 |
| Ratio (p/p) | 3.86 | 5.26 | 4.34 |
| T cond (° C.) | 110 | 110 | 110 |
| T outlet comp (° C.) | 116 | 110 | 121 |
| CAP (kJ/m$^3$) | 2573 | 1157 | 2172 |
| COP | 3.56 | 3.97 | 4.00 |
| % CAP | 100 | 45 | 84 |
| % COP | 100 | 111 | 112 |

Example 5

The performances of the refrigerant fluid under the heat pump operating conditions and by setting the temperature at the evaporator to 50° C. and that at the condenser to 120° C. are given below.

For HCFC-114, the nominal operating pressure is 20.82 bar, the volumetric capacity is 2257 kJ/m.sup.3 and the COP is 2.79 under the following operating conditions:
Isentropic efficiency of the compressor: 80%

|  | HCFC-114 | HFC-365mfc | HCFO-1233zd |
|---|---|---|---|
| Temp evap (° C.) | 50 | 50 | 50 |
| T e comp | 65 | 65 | 65 |
| Evap P (kPa) | 447 | 142 | 298 |
| Cond P (kPa) | 2082 | 936 | 1581 |
| Ratio (p/p) | 4.66 | 6.58 | 5.30 |
| T cond (° C.) | 120 | 120 | 120 |
| T outlet comp (° C.) | 125 | 120 | 130 |
| CAP (kJ/m$^3$) | 2257 | 1063 | 2015 |
| COP | 2.79 | 3.25 | 3.29 |
| % CAP | 100 | 47 | 89 |
| % COP | 100 | 116 | 118 |

Example 6

The performances of the refrigerant fluid under the heat pump operating conditions and by setting the temperature at the evaporator to 80° C. and that at the condenser to 110° C. are given below.

For HCFC-114, the nominal operating pressure is 17.26 bar, the volumetric capacity is 5475 kJ/m.sup.3 and the COP is 7.94 under the following operating conditions:
Isentropic efficiency of the compressor: 80%

|  | HCFC-114 | HFC-365mfc | HCFO-1233zd |
|---|---|---|---|
| Temp evap (° C.) | 80 | 80 | 80 |
| T e comp (° C.) | 90 | 90 | 90 |
| Evap P (kPa) | 930 | 352 | 663 |
| Cond P (kPa) | 1726 | 748 | 1294 |
| Ratio (p/p) | 1.86 | 2.12 | 1.95 |
| T cond (° C.) | 110 | 110 | 110 |
| T outlet comp (° C.) | 116 | 111 | 117 |
| CAP (kJ/m$^3$) | 5475 | 2872 | 4705 |
| COP | 7.94 | 8.83 | 8.72 |
| % CAP | 100 | 52 | 86 |
| % COP | 100 | 111 | 110 |

Example 7

The performances of the refrigerant fluid under the heat pump operating conditions and by setting the temperature at the evaporator to 80° C. and that at the condenser to 120° C. are given below.

For HCFC-114, the nominal operating pressure is 20.82 bar, the volumetric capacity is 4810 kJ/m.sup.3 and the COP is 5.45 under the following operating conditions:
Isentropic efficiency of the compressor: 80%

|  | HCFC-114 | HFC-365mfc | HCFO-1233zd |
|---|---|---|---|
| Temp evap (° C.) | 80 | 80 | 80 |
| T e comp (° C.) | 90 | 90 | 90 |
| Evap P (kPa) | 930 | 352 | 663 |
| Cond P (kPa) | 2082 | 936 | 1581 |
| Ratio (p/p) | 2.24 | 2.66 | 2.38 |
| T cond (° C.) | 120 | 120 | 120 |
| T outlet comp (° C.) | 126 | 120 | 127 |
| CAP (kJ/m$^3$) | 4810 | 2648 | 4360 |
| COP | 5.45 | 6.36 | 6.24 |
| % CAP | 100 | 55 | 91 |
| % COP | 100 | 117 | 114 |

Example 8

The performances of the refrigerant fluid under the heat pump operating conditions and by setting the temperature at the evaporator to 80° C. and that at the condenser to 130° C. are given below.

For HCFC-114, the nominal operating pressure is 24.92 bar, the volumetric capacity is 4027 kJ/m.sup.3 and the COP is 3.79 under the following operating conditions:
Isentropic efficiency of the compressor: 80%

|  | HCFC-114 | HFC-365mfc | HCFO-1233zd |
|---|---|---|---|
| Temp evap (° C.) | 80 | 80 | 80 |
| T e comp (° C.) | 90 | 90 | 90 |
| Evap P (kPa) | 930 | 352 | 663 |
| Cond P (kPa) | 2492 | 1157 | 1913 |
| Ratio (p/p) | 2.68 | 3.28 | 2.88 |
| T cond (° C.) | 130 | 130 | 130 |
| T outlet comp (° C.) | 136 | 130 | 136 |
| CAP (kJ/m$^3$) | 4027 | 2403 | 3967 |
| COP | 3.79 | 4.81 | 4.71 |
| % CAP | 100 | 60 | 99 |
| % COP | 100 | 127 | 124 |

Example 9

The performances of the refrigerant fluid under the heat pump operating conditions and by setting the temperature at the evaporator to 80° C. and that at the condenser to 140° C. are given below.

For HCFC-114, the nominal operating pressure is 29.61 bar, the volumetric capacity is 2971 kJ/m.sup.3 and the COP is 2.46 under the following operating conditions:

Isentropic efficiency of the compressor: 80%

|  | HCFC-114 | HFC-365mfc | HCFO-1233zd |
|---|---|---|---|
| Temp evap (° C.) | 80 | 80 | 80 |
| T e comp (° C.) | 90 | 90 | 90 |
| Evap P (kPa) | 930 | 352 | 663 |
| Cond P (kPa) | 2961 | 1417 | 2295 |
| Ratio (p/p) | 3.19 | 4.02 | 3.46 |
| T cond (° C.) | 140 | 140 | 140 |
| T outlet comp (° C.) | 147 | 140 | 147 |
| CAP (kJ/m$^3$) | 2971 | 2134 | 3520 |
| COP | 2.46 | 3.73 | 3.62 |
| % CAP | 100 | 72 | 118 |
| % COP | 100 | 152 | 147 |

The invention claimed is:

1. A heat transfer process using a compression system comprising successively a step of evaporation of a refrigerant fluid, a step of compression of said refrigerant fluid, a step of condensation of said refrigerant fluid at a temperature greater than or equal to 110° C. and a step of expansion of said refrigerant fluid, wherein the refrigerant comprises at least 10% by weight of trans-1-chloro-3,3,3-trifluoropropene and at least 10% by weight a fluoroalkene.

2. The process as claimed in claim 1, wherein the temperature is between 110 and 140° C.

3. The process as claimed in claim 1, wherein the refrigerant fluid comprises at least one hydrofluoroether.

4. The process as claimed in claim 1, wherein the temperature is between 110 and 125° C.

5. The process as claimed in claim 1, wherein the refrigerant fluid comprises at least 10% by weight a hydrofluorocarbon.

6. The process as claimed in claim 1, wherein the temperature is between 120 and 140° C.

7. The process as claimed in claim 1, wherein the temperature is between 130 and 140° C.

8. A heat transfer process using a compression system comprising successively a step of evaporation of a refrigerant fluid, a step of compression of said refrigerant fluid, a step of condensation of said refrigerant fluid at a temperature greater than or equal to 110° C. and a step of expansion of said refrigerant, wherein the refrigerant comprises trans-1-chloro-3,3,3-trifluoropropene.

9. The process as claimed in claim 8, wherein the temperature is greater than or equal to 130° C.

10. The process as claimed in claim 8, wherein the temperature is greater than or equal to 120° C.

11. The process as claimed in claim 8, wherein the refrigerant fluid comprises at least one hydrofluorocarbon.

12. The process as claimed in claim 8, wherein the refrigerant fluid comprises at least one hydrofluoroether.

13. The process as claimed in claim 8, wherein the refrigerant fluid comprises at least one fluoroalkene.

* * * * *